Patented Sept. 16, 1941

2,255,825

UNITED STATES PATENT OFFICE 2,255,825

PAINT COMPOSITION

John R. Skeen, Philadelphia, Pa., assignor to The United Gas Improvement Company, a corporation of Pennsylvania No Drawing. Application July 25, 1939, Serial No. 286,331

6 Claims. (Cl. 134—51)

This invention pertains generally to liquid coating compositions and pertains particularly to the class of substances generally known as paint. The invention pertains more particularly to paints that are subjected to severe service conditions.

The invention will be described in connection with service conditions met with by paints applied to gas holders. However, it is to be understood that the invention may be used for other purposes.

Paints applied to water-sealed gas holders meet with at least three different types of conditions in service, depending upon the portion of the holder under consideration.

For instance, paint applied to the crown is always subjected to atmospheric conditions such as sunlight, rain, wind, etc.; paint applied to the inside of the tank at and below the water line and to the inner surfaces of the cups is continuously immersed in water; whereas, paint applied to the sides of the lift or lifts is alternately subjected to immersion in water and to atmospheric conditions of which sunlight is the most important.

The paint applied to the lower part of the lift of a single lift holder and the paint applied to the lower lift or lifts of a multiple lift holder are often subjected to extreme immersion conditions for long periods of time, followed by exposure to sunlight.

Paint failure resulting from immersion in water is due, among other things, to seepage of water through the paint film causing blisters and corrosion between the paint film and the surface to which the paint is intended to adhere. The latter is particularly true of metallic surfaces and especially of iron and steel surfaces. The migration through the paint film of oxygen contained in the water is also a principal factor since this tends to cause cracking, checking, and/or alligatoring.

Failure of certain paints, such as bituminous paints, where exposed to the atmosphere, is caused primarily by sunlight and particularly by ultra violet bands as well as by the migration of atmospheric oxygen through the paint film. The result is cracking, checking and/or alligatoring of the paint.

This becomes of extreme importance on those surfaces which are continuously or alternately immersed because cracks, checks and decreasing thickness at alligator lines decrease resistance to water seepage and lower the impedance of the film generally.

It is common experience that paint films which are continuously immersed or immersed for long periods of time have a very short useful life.

Conditions at or about the water line appear to be the most severe upon any paint film.

In accordance with my invention these difficulties are materially overcome by the use of a primer coat or coats comprising a supercooled liquid over which may be applied, if desired, a suitable top coat or coats to be hereinafter more particularly described.

A supercooled liquid might be defined as a substance which partakes of some of the characteristics of a solid such as rigidity, but lacks certain other essential characteristics of solid substances such as a definite melting point. The rigid or semi-rigid character of a supercooled liquid is attributed to high viscosity rather than to solidification.

A paint film resulting from the use of a pitch paint is an example of a supercooled liquid, provided the film is not permitted to solidify such as by polymerization or oxidation or both.

It is my experience that liquid primer coats will not blister as rapidly as solid or elastic primer coats.

I find further that I can very materially decrease the seepage of water and migration of oxygen through my liquid primer coat by adding thereto a discoid filler such as mica, finely divided or flaked aluminum, flaked lead, or the like, the function of which is to impede migration of water and oxygen by forming a vast number of tortuous paths through which the water and oxygen must travel before it can cause material damage.

It will be understood that these flakes or plates usually have perimeters of many different geometrical configurations. The term "discoid" therefore, is not to be construed as limited to any one configuration such as circular.

In addition to impeding the migration of water and oxygen, the discoid filler (1) improves the body, pull and slip of the paint; (2) permits application of a top coat after a shorter drying interval; (3) toughens the film markedly on drying; (4) increases the adhesion of the film to the metal surface even after prolonged immersion; and (5) retards embrittlement of the film on immersion.

I find further that the prevention or retardation of polymerization (which is largely responsible for cracking, checking and alligatoring) through the addition of alpha-naphthylamine greatly adds to the useful life of the paint. In fact, in the case of alpha-naphthylamine, as distinguished from a large number of other inhibitors, the life of the paint appears to be extended almost indefinitely. Alpha-naphthylamine acts to inhibit polymerization both in sunlight and upon immersion. The latter is particularly important. Very few, if any other inhibitors have this double-acting quality.

The discoid filler above referred to not only functions to prevent rapid penetration of water and oxygen through the paint film but also greatly retards loss of alpha-naphthylamine which is water soluble. It also functions to greatly retard or prevent bleeding of the liquid primer coat into the top coat as will hereinafter appear.

For my liquid primer coat I prefer to use a pitch paint, for instance, paints made with petroleum or coal tar pitch, although, generally speaking, any other bituminous paint might be employed.

While the softening point of the pitch used in making the paint may vary somewhat, depending upon the results desired, I prefer to have the softening point between approximately 140 and 165° F. so that the resultant film will not be too brittle at ordinary temperatures and will not be too fluid at higher temperatures. A softening point between 150 and 155° F. is very satisfactory.

The following will illustrate a manner in which a pitch paint for the primer coat may be made up. Table 1 shows proportions and ingredients which may be varied, consistent with good paint practice, to retain desired qualities such as body, brushability, slip, etc.

TABLE 1

*Materials for 68 gallons*

| Ingredient | Mass in pounds | Percent by weight | Percent by weight without thinner |
|---|---|---|---|
| Pitch | 413.00 | 50.0 | 64.9 |
| Alpha-naphthylamine | 21.25 | 2.6 | 3.3 |
| Mica | 73.75 | 8.9 | 11.5 |
| Flaked lead | 116.25 | 14.0 | 18.1 |
| Asbestos | 13.75 | 1.6 | 2.2 |
| Thinner | 189.20 | 22.9 | |
| Total | 827.20 | 100.0 | 100.0 |

Generally speaking, the asbestos is added to avoid or reduce "curtaining." The mica is added not only because of its discoid character but also because it imparts a desired slip due to its lubricating properties.

Mica also distributes or disperses itself throughout the mass more uniformly than aluminum or flaked lead, since both aluminum and flaked lead tend to "leaf," that is, concentrate at the surface. I prefer to have present in my paint both types of discoid fillers. For the purpose of the claims the former type of discoid filler will be referred to as "dispersing discoid filler" and the latter type as "leafing discoid filler."

The following is an example of how the ingredients of the above formula might be mixed.

A steam jacketed mixing vat with a capacity of 100 gallons and having a slowly revolving mixing rotor is employed.

The pitch is broken into small pieces, placed in the vat and melted. After melting the temperature is held at between 200 and 212° F. Five gallons of the thinner, which may be naphtha, are then added together with the alpha-naphthylamine which is dissolved in the thinner. The mix is then cooled to room temperature with continued agitation whereupon five additional gallons of thinner are added followed by the asbestos. Mixing is continued for about fifteen minutes whereupon the mica is added. After fifteen minutes of additional agitation the balance of the thinner and the flaked lead are added. A stick is used to assist in breaking up the lumps of flaked lead. Mixing is continued for an additional four hours whereupon the paint is ready for use.

Table 2 shows proportions and ingredients of another example.

TABLE 2

| Ingredient | Percent by weight |
|---|---|
| Pitch | 42.1 |
| Wax oil | 3.6 |
| Tung oil | 1.2 |
| Alpha-naphthylamine | 2.2 |
| Asbestos | 1.5 |
| Kaolin | 14.0 |
| Slate flour | 13.3 |
| Thinner (heavy naphtha) | 22.1 |
| Total | 100.0 |

The viscosity will be approximately 14 to 15 seconds Gardner.

Generally speaking, the composition may vary over a fairly wide range consistent with good paint practice. This is illustrated by way of example in the following table.

TABLE 3

| Ingredient | Percent by weight |
|---|---|
| Pitch | 62 to 68 |
| Alpha-naphthylamine | 3.0 and above |
| Mica | 7.8 to 13 |
| Flaked lead | 13 to 20 |
| Asbestos | 0 to 2.5 |
| Total | 100 |

Thinner is added to obtain the desired viscosity which is usually between 22 and 38 seconds Gardner, and the ingredients may be mixed in any manner and by any means known in the art.

While broadly speaking the liquid primer coat may be of any desired thickness without departing from the spirit of the invention, I find that the life of the paint will be greatly increased if a certain minimum thickness is exceeded. For instance, the resultant primer coat will be highly resistant to the effects of immersion, alternate or otherwise, if one gallon of paint is not made to cover more than say 400 to 500 square feet with approximately 400 square feet or better 350 square feet, as a good average limit.

The term "liquid primer coat" is used here to signify the total primer film whether built up by one or more applications. A film of this preferred thickness may be readily built up in a single application.

The paint may be applied in any suitable manner, for instance, with a brush.

I find that changes in temperature and particularly high summer temperatures may tend to cause the liquid primer coat to flow and wrinkle and then develop stresses on cooling. I have discovered that I may overcome this by applying a rigid top coat over the liquid primer coat such as that afforded by a standard aluminum paint.

This holds the liquid primer coat in place despite its fluid character. The tortuous paths furnished by the discoid filler and particularly the concentration of filler at the surface commonly known as leafing, such as takes place with aluminum or flaked lead for instance, prevents the liquid primer coat from bleeding into and discoloring the top coat.

On the other hand, there are conditions under which I may prefer to use as a top coat one or more applications of the paint used for the primer coat. For instance, if the painted surface is not exposed to the sun I may not need the rigid top coat to hold the liquid primer coat in place, nor the capacity and reflecting power of this top coat to decrease transmission of ultra violet light to the primer coat where it would tend to cause polymerization. In other words, my so-called primer coat is itself well adapted for affording ample protection to surfaces submerged in water.

A top coat or coats of a rigid character such as that afforded by an aluminum paint will hold my liquid primer coat in place, regardless of ordinary temperature conditions, and it is found that the resultant paint job has a much longer useful life than results from the use of elastic films as top coats. Elastic films result from the use of the ordinary red or black paints whose pigments are spheroid as contrasted with discoid.

However, even when elastic top coats are used, the superior character of the primer coat materially extends the useful life of the paint job.

Any other suitable rigid top coat may be substituted for that afforded by an aluminum paint. For instance, flaked lead may be substituted for aluminum in the top coat paints. This will result in a rigid top coat of a superior character.

In choosing a top coat to be used over my primer coat, for best results consideration should be given to the following:

(1) Its capacity to resist transmission of ultra violet light.

(2) Its capacity to resist transmission of oxygen.

(3) Its capacity to resist solution of alpha-naphthylamine from the primer coat when the painted surface is immersed in water.

(4) Its capacity to wet and adhere to the primer coat.

(5) Its capacity to dry quickly to prevent possible distortion of the primer coat by flowing.

(6) Its capacity to resist solution or transmission of discoloring materials from the primer coat.

(7) Its capacity to meet ordinary good paint specifications.

It is found that standard aluminum paints and particularly those of good quality meet the above specifications and in addition provide the rigid film above referred to.

A top coat of the same material as the primer coat oddly enough meets practically all of the above specifications. This is because its discoid filler resists transmission of ultra violet light, oxygen and water, even though it itself would be attacked; being of the same material it will wet and strongly adhere to the primary coat; it will dry quickly and thus prevent flow during drying even though it will not prevent flow of the primer coat after drying; it is of the same color as the primer coat so that discoloration is no factor, although its discoid filler would prevent bleeding to the surface if it were of a different color; and it can be readily made to meet good paint specifications.

With respect to other types of paints such as those which result in elastic top coat films of which the ordinary red and black paints are examples, it is found that these will be generally more or less suitable if their vehicles are quick drying and composed of tung or linseed oils in which has been incorporated resins such as those of the phenol-formaldehyde type.

Suitable top coats meeting the above specifications will suggest themselves to persons skilled in the art upon becoming familiar with this invention.

Whether my "primer coat" of pitch base composition is used by itself or is used in conjunction with a top coat of a different composition, (such as, for example, aluminum paint, as herein indicated) it will be found that its nature is such as to resist corrosion to a remarkable degree. Part of this corrosion resistance is due to the ability of my composition by reason of its fluidity to penetrate minute cracks or holes in the structural steel or in the mill scale which almost invariably is found upon unprotected structural shapes.

Gas holder plates in common to various degress with other structural steel may arrive at the place of construction in the following states:

1. With a shop coat of red lead.
2. A shop coat of linseed oil.
3. Unprotected.

In the first case a second coat of red lead followed by a top coat is normal practice after the erection of the holder. If the plates are coated with linseed oil they are first cleaned with solvent and wire brushed and then primed with red lead. If the plates have not been shop coated with anything they may be permitted to rust on the erection site for 4 to 12 months. In any event, it requires about four months to erect a holder and in this time serious corrosion will have occurred.

Corrosion is often permitted to continue up to a year with the object of removing already loose mill scale. While successful in this object the difficulty arises in loosening additional mill scale. While mill scale is highly resistant to corrosion as contrasted with the underlying mild steel the mill scale is variously and minutely cracked, scarred and nicked. However slowly the scale corrodes at such weak places, sooner or later the underlying soft metal is exposed so that in effect myriad electrode points become operative so that the rate of corrosion at such foci increases manifold. Thus, on the one hand, pitting begins while on the other hand, corrosion migrates at the interface of scale and mild steel. While the first is serious enough the second is even more so because with time chips, plates, or discs of mill scale are separated from the underlying metal.

When weathered mill metal is to be primed, it is impossible to remove reasonably well fixed mill scale by wire brushing, hence corrosion will still continue at the interface (pits and capillary spaces) and the prime coat which is anti-corrosive in nature by virtue of its pigment or filler will cover the reticulated and variously roughened metal surface only moderately well. This introduces the serious problem of bridging of films and by bridging is meant the failure of a relatively quick drying film to penetrate capillary spaces or sharp angles of metal. The degree of failure is the measure of the failure of the prime coating put on previously unprimed metal. In other words, a film bridging to a high degree will permit corrosion to continue with subsequent lifting of the mill scale, which lifting exposes fresh and unprimed metal surfaces to continue or even hasten corrosion and this in turn will necessitate frequent removal by wire brushing and repriming which involves a substantial loss in time and labor.

In this regard, paints may be divided into three major classes with respect to their efficacy as primers:

1. Quick drying films such as lacquers or tung oil which bridge to the maximum degree and are most unsuited for use as primers on roughened or mill scaled metal. They simply set before the vehicle has had time to penetrate to a sufficient extent.

2. Slow drying oil films such as made with linseed oil. Red lead or iron oxide may be used as a non-corrosive filler. Because such films are slow drying they remain fluid longer than lacquer type films and thus penetrate to a greater extent into capillary spaces. Nevertheless, they lose their liquidity in a relatively short time and thus are inadequate to effectively combat serious corrosion problems of the type herein disclosed.

3. Permanently liquid films such as represented by my pitch base primer. Because liquidity remains over extremely long periods of time by virtue of the presence of alpha-naphthylamine, almost unlimited time is available for penetration.

To summarize, the quick drying type of film of the first class outlined above is entirely inadequate for use as primers on roughened or mill scaled metal because it is unable to penetrate the interstices where corrosion begins and takes its greatest toll. Obviously, such a film could exert no protective effect whatsoever upon metal surfaces as they become freshly exposed with the passage of time due to lifting of the mill scale. A film of the second or slow-drying type would have somewhat greater penetrating power, yet as soon as such a film dried it could no longer protect metal surfaces freshly exposed due to the inevitable corrosion and it would, therefore, become of as little value as a film of the first type in combatting continued corrosion. A film of the third or permanently liquid type, however, possesses the property during substantially its entire useful life of being able to penetrate to, and protectively cover, freshly exposed metal surfaces. Since my pitch paint remains liquid for much longer periods of time than do other pitch paints lacking my novel combination of ingredients, my paint retains its efficiency with respect to penetration over correspondingly longer periods of time, as amply demonstrated in service tests.

I find that my new paint films are not only highly resistant to extreme immersion conditions but are also highly alkali resisting. They are, therefore, admirably suited for use along with my treatment of holder water to prevent holder discoloration and corrosion as described and claimed in my copending application Serial Number 168,911, filed October 14, 1937, now Patent Number 2,141,049 dated November 22, 1938.

While I have described my improved paint composition as applied to a gas-holder, it will be obvious that it is of wider utility. It may be used to protect any surfaces which are submerged in or by water and which may or may not be alternately exposed to the atmosphere, particularly sunlight. Thus, it may be used to coat the linings of open tanks containing water (e. g. tanks placed on roofs of buildings to exert a cooling effect due to evaporation), ships' hulls, dry docks, wharfs, and similar structures or structures subjected to similar severe service conditions.

The term "comprising" unless otherwise qualified is used in the claims in its usually accepted meaning which does not exclude the presence of substances other than those specifically recited.

This application is a continuation in part of my copending application Serial Number 171,197, filed October 27, 1937.

Having particularly described my invention, it is to be understood that this is by way of illustration and that changes, omissions, additions, substitutions and/or modifications might be made within the scope of the claims without departing from the spirit of the invention.

I claim:

1. A liquid coating composition comprising from 62 to 68% pitch, at least 3% α-naphthylamine, from 7.8 to 13% mica, from 13 to 20% leafing discoid filler and from 0 to 2.5% asbestos to make 100% and having sufficient thinner added thereto to bring the viscosity of the resultant mixture to within 22 to 38 seconds Gardner.

2. A liquid coating composition comprising the following constituents in the approximate proportions given; pitch, 50%; α-naphthylamine, 2.6%; mica, 8.9%; leafing discoid filler, 14.0%; asbestos, 1.6% and thinner, 22.9%.

3. A liquid coating composition comprising the following constituents in the approximate proportions given: pitch, 42.1%; wax oil, 3.6%; tung oil, 1.2%; α-naphthylamine, 2.2%; asbestos, 1.5%; kaolin, 14.0%; slate flour, 13.3%, and thinner, 22.1%.

4. A liquid coating composition comprising approximately from 62 to 68% pitch having a softening point between approximately 140° F. and 165° F., at least approximately 3% alpha naphthylamine, approximately from 7.8% to 13% dispersing discoid filler, approximately from 13% to 20% leafing discoid filler, approximately from 0% to 2.5% asbestos, and sufficient thinner to bring the mixture to a desired viscosity.

5. A liquid coating composition comprising on a thinner free basis approximately from 62% to 68% pitch having a softening point between approximately 140° F. and 165° F., at least approximately 3% α-naphthylamine, approximately from 7.8% to 13% dispersing discoid filler, approximately from 13% to 20% leafing discoid filler, and approximately from 0% to 2.5% asbestos.

6. A liquid coating composition comprising on a thinner free basis approximately from 62% to 68% coal tar pitch having a softening point between approximately 140° F. and 165° F., at least approximately 3% α-naphthylamine, approximately from 7.8% to 13% dispersing discoid filler, approximately from 13% to 20% leafing discoid filler, and approximately from 0% to 2.5% asbestos.

JOHN R. SKEEN.